(12) United States Patent
Takahashi

(10) Patent No.: US 8,456,661 B2
(45) Date of Patent: Jun. 4, 2013

(54) AUTHENTICATION PRINTING TECHNIQUE

(75) Inventor: Yusuke Takahashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 730 days.

(21) Appl. No.: 12/372,399

(22) Filed: Feb. 17, 2009

(65) Prior Publication Data

US 2009/0268224 A1    Oct. 29, 2009

(30) Foreign Application Priority Data

Feb. 19, 2008    (JP) ................... 2008-037907

(51) Int. Cl.
*G06K 15/00* (2006.01)

(52) U.S. Cl.
USPC .......................... 358/1.14; 358/1.16

(58) Field of Classification Search
USPC ............. 358/1.14, 1.15, 1.16; 347/2
See application file for complete search history.

(56) References Cited

U.S. PATENT DOCUMENTS

| 6,362,893 B1 * | 3/2002 | Francis et al. ............. 358/1.14 |
| 2005/0100378 A1 * | 5/2005 | Kimura et al. ............. 400/76 |
| 2007/0107042 A1 * | 5/2007 | Corona ............................. 726/2 |
| 2008/0034403 A1 * | 2/2008 | Kakigi ............................. 726/1 |
| 2008/0140572 A1 * | 6/2008 | Jackson ........................ 705/51 |
| 2010/0141978 A1 | 6/2010 | Nomura et al. |

FOREIGN PATENT DOCUMENTS

| JP | 2004-126859 A | 4/2004 |
| JP | 2005-053001 A | 3/2005 |
| JP | 2005-204242 A | 7/2005 |
| JP | 2005-259012 A | 9/2005 |
| JP | 2005-280139 A | 10/2005 |
| JP | 2006-146665 A | 6/2006 |
| JP | 2006-341496 A | 12/2006 |

* cited by examiner

*Primary Examiner* — King Poon
*Assistant Examiner* — Jamares Q Washington

(57) ABSTRACT

The authentication printing technique of the invention obtains attachment information regarding attachment of a preset device, such as a hard disk drive, to a printing apparatus. In response to a request for a printing operation with the printing apparatus, the authentication printing technique refers to the obtained attachment information and restricts an authentication printing process according to the attachment information of the preset device. The authentication printing process externally receives print data and prints the received print data on completion of a preset authentication operation. This arrangement effectively reduces the potential for leakage of information from the device attached to the printing apparatus.

14 Claims, 14 Drawing Sheets

Fig.6

Authentication Information
(Magnetic Card Reader for Authentication)

| User ID | Authentication Data |
|---------|---------------------|
| Suzuki  | 6XP$441             |
| Sato    | 786Z;US             |
| Tanaka  | KY37Q#1             |

Fig.7

Authentication Operation (Authentication Server)

| User ID   | Authentication Result | Reply Information (System Permission ID) |
|-----------|----------------------|------------------------------------------|
| Suzuki    | OK                   | 00111                                    |
| Sato      | OK                   | 00222                                    |
| Tanaka    | OK                   | 00888                                    |
| Takahashi | NG                   | None                                     |

Fig.10

Spooler Management Table

| Authentication Data | Print Data | Print Job Attribute Information |
|---|---|---|
| Authentication Data A1 | Print Data PD1 | Security Level 1 |
| Authentication Data A2 | Print Data PD2 | Security Level 2 |
| Authentication Data A3 | Print Data PD3 | Security Level 3 |
| ⋮ | ⋮ | ⋮ |

Fig.13

Security Strength value Computation Table

| Data Storage Level of HDD | Value |
|---|---|
| No Storage | 10 |
| Kept Stored on Completion of Printing | −5 |
| Stored in Encrypted Form | 4 |
| High Encryption Level | 3 |
| Medium Encryption Level | 2 |
| Low Encryption Level | 1 |
| Unknown | −10 |

Fig.14

Security Strength

| Range of Security Strength Value | Security Strength |
|---|---|
| Not less than 10 | High |
| Not less than 5 but less than 10 | Medium |
| Less than 5 | Low |

Fig.15

Security Level

| Level | Specification |
|---|---|
| High | Documents to be kept secret from outside department |
| Medium | Documents to be kept secret from outside company |
| Low | Non-classified documents |

Print Job Attribute Information (Printer Server)

| System Permission ID | Print Data (Binary Form) | Security Level |
|---|---|---|
| 00111 | Test.txt | Highly Confidential |
| 00111 | Document.txt | Low Confidential |
| 00222 | Yosan.txt | Low Confidential |
| 00888 | Memo.txt | Low Confidential |

AUTHENTICATION PRINTING TECHNIQUE

CLAIM OF PRIORITY

The present application claims priority from Japanese application P2008-37907A filed on Feb. 19, 2008, the contents of which are hereby incorporated by reference into this application.

BACKGROUND

1. Field of the Invention

The present invention relates to a technique of authentication printing process that allows a printing operation only on completion of a preset authentication operation.

2. Description of the Related Art

Implementation of the personal information protection law and tendency of the enhanced internal control increasingly attract attention in management of classified information from companies and organizations. In the case of printing classified information, when a printing apparatus is located away from a terminal operated by a user to give a print instruction, there is a risk that a printout of the classified information may be leaked to a third person before the user reaches the location of the printing apparatus. An authentication printing system has been proposed as a countermeasure against this potential problem to suspend a printing operation after the user's print instruction and allow the actual printing operation only upon successful authentication of the user on the side of the printing apparatus by the printing apparatus or a printer server (see, for example, Japanese Patent Laid-Open No. 2005-259012).

The printing apparatus may be equipped with a nonvolatile storage medium, such as a hard disk drive, to temporarily store print data in the printing process. The nonvolatile storage medium may be designed to be detachable from the printing apparatus. The detachment of the nonvolatile storage medium from the printing apparatus may, however, cause leakage of print data. Some techniques have been proposed as the countermeasures against such potential for information leakage, for example, a technique of encrypting data in the nonvolatile storage medium (see, for example, JP-A-No. 2006-146665) and a technique of providing a print mode without using the nonvolatile storage medium (see, for example, JP-A-No. 2006-341496).

These prior art techniques, however, require the specific functions on the printing apparatus. It is thus difficult to provide the authentication printing system with little possibility of information leakage in a network including a printing apparatus without such specific functions.

SUMMARY

In order to solve the problem of the prior art explained above, there would be a demand for enhancing the security level in an authentication printing process that performs a printing operation on completion of a preset authentication operation.

The present invention accomplishes at least part of the demand mentioned above and the other relevant demands by the following configurations applied to the authentication printing apparatus, the authentication printing system, the authentication server, the authentication printing control method, the authentication printing method, the authentication method, as well as the programs causing the computer to implement the functions of the authentication printing control method, the authentication printing method, and the authentication method.

According to one aspect, the invention is directed to an authentication printing apparatus configured to perform an authentication printing process, which externally receives print data and prints the received print data on completion of a preset authentication operation. The authentication printing apparatus includes: an attachment information acquisition module configured to obtain attachment information regarding attachment of a preset device to the authentication printing apparatus; and an authentication printing restriction module configured to, in response to reception of a print request for a printing operation with the authentication printing apparatus, refer to the obtained attachment information and restrict the authentication printing process according to the attachment information regarding attachment of the preset device.

The authentication printing apparatus according to this aspect of the invention obtains the attachment information regarding attachment of the preset device to the authentication printing apparatus. In response to a request for a printing operation with the authentication printing apparatus, the authentication printing apparatus refers to the obtained attachment information and restricts the authentication printing process according to the attachment information of the preset device. The authentication printing apparatus of this arrangement deals with a potential influence on the security of authentication printing by the device attached to the authentication printing apparatus. The attachment information on the attachment of the preset device may be obtained, for example, from a management information base (MIB) of the authentication printing apparatus.

In one preferable application of the authentication printing apparatus according to the above aspect of the invention, the preset device is a storage device of a nonvolatile storage medium that is capable of storing print data, and the attachment information represents attachment or no attachment of the storage device.

The preset device attached to the authentication printing apparatus may be a storage device of a nonvolatile storage medium, for example, a hard disk drive, a semiconductor memory drive of a flash memory, and a writable DVD-RAM. The authentication printing process is restricted in the state of attachment of such a storage device to the authentication printing apparatus. The storage device, such as a hard disk drive, is physically attached to the authentication printing apparatus and is thus physically detachable from the authentication printing apparatus. Storage of print data in such a storage device, may cause leakage of the print data from the storage device. It is thus effective for restricting the authentication printing process, based on attachment or non-attachment of such a storage device to the authentication printing apparatus.

The authentication printing apparatus of the above application may further have an authentication data input module configured to input authentication data for the authentication operation. The authentication data input module used to input the authentication data into the authentication printing apparatus is, for example, a barcode reader, a card reader, a fingerprint authentication device, a vein authentication device, or a keyboard for direct entry of an ID and a password.

Various techniques may be adopted for restricting the authentication printing process in the authentication printing apparatus.

In one preferable embodiment of the authentication printing apparatus of the invention, the authentication printing restriction module prohibits the authentication data input module from inputting the authentication data, as the restriction of the authentication printing process.

In another preferable embodiment of the authentication printing apparatus of the invention, the authentication printing restriction module prevents the authentication data from being output to an authentication processor that is configured to perform the authentication operation, as the restriction of the authentication printing process.

In still another preferable embodiment of the authentication printing apparatus of the invention, the authentication printing restriction module restricts a print job of externally obtaining the print data and printing the obtained print data, as the restriction of the authentication printing process.

Any of these techniques of restricting the authentication printing process effectively prevents leakage of data.

In one preferable application of the authentication printing apparatus of the last embodiment, the restriction of the print job limits acquisition of print job attribute information, which is to be referred to for externally obtaining the print data and printing the obtained print data. This arrangement enables the print job to be dealt with in substantially the same manner under restriction of the authentication printing process and under non-restriction of the authentication printing process, thus simplifying the processing.

In one preferable embodiment of the invention, the authentication printing apparatus having any of the above structures further has a notification module configured to notify a user of information. When restricting the authentication printing process, the authentication printing restriction module controls the notification module to notify the user of information on the restriction.

The user of the authentication printing apparatus is thus readily notified of the situation requiring some restriction on the authentication printing process. For example, when a storage device is newly attached to the authentication printing apparatus originally with no storage device, the notification module notifies the user of the information on the restriction of the authentication printing process. The user is thus readily informed of alteration of the authentication printing apparatus. Any of various techniques may be adopted for such notification, for example, a letter string given as a message on a display unit, lighting, blinking light, a voice message, and vibration. A verification module may be additionally provided in combination with the notification module to authenticate the user based on a password or another equivalent means and allow print data to be obtained and printed upon verification by the user.

In another preferable embodiment of the invention, the authentication printing apparatus further has: a print job attribute information acquisition module configured to acquire print job attribute information, which is to be referred to for externally obtaining the print data and printing the obtained print data and includes information specifying a security level of the print data; a security level identification module configured to, in response to reception of the print request for the printing operation with the authentication printing apparatus, identifies the security level of the print data specified by the obtained print job attribute information; and a printing module configured to, when the authentication printing restriction module restricts the authentication printing process, obtain the print data and print the obtained print data with regard to the print job having the security level specified by the print job attribute information and identified by the security level identification module to be not higher than a preset reference level.

The print job attribute information includes the information specifying the security level of the print data. Even under restriction of the authentication printing process, with regard to the print job of the low security level, the authentication printing apparatus of this embodiment allows the print data to be obtained and printed. This arrangement flexibly deals with the print job.

In one application of the invention, the authentication printing apparatus of this embodiment further has a verification module configured to, when the authentication printing restriction module restricts the authentication printing process, ask a user to verify whether the printing operation is to be continued with regard to the print job having the security level specified by the print job attribute information and identified by the security level identification module to be higher than the preset reference level. The printing module obtains the print data and prints the obtained print data, on verification that printing operation is to be continued.

The authentication printing apparatus of this application enables the printing operation of the print data to be continued upon verification by the user even under restriction of the authentication printing process. This arrangement flexibly deals with the print job having the known security level. As one technique adopted for verification by the user, the authentication printing apparatus may be provided with an interface used for the user's entry of a password for identifying the user and the user's entry of a print instruction. One typical example of the interface is a numeric keypad for entries of a password and a print instruction. Another example of the interface is a combination of an authentication device, such as a fingerprint authentication device or a vein authentication device with a specific key for entry of a print instruction. The verification by the user may be a combination of voiceprint or another voice authentication with voice recognition-based entry of a print instruction.

In one preferable embodiment of the authentication printing apparatus that may be equipped with the storage device, the attachment information includes a security strength representing a difficulty in externally reading out the print data stored in the storage device. The authentication printing restriction module restricts a print job of externally obtaining the print data and printing the obtained print data, when the security strength is not higher than a predetermined reference value.

The authentication printing apparatus of this embodiment restricts the print job, when the security strength representing the difficulty in externally reading out the print data stored in the storage device is not higher than the predetermined reference value. This arrangement desirably reduces the possibility of externally reading out the print data, while enabling the print job to be adequately performed. The degree of restriction of the authentication printing process based on the attachment information may be adjusted according to the security strength. In the authentication printing apparatus equipped with the storage device, the security strength may be an evaluation value representing the difficulty in reconstruction of print data that is once stored in the storage device and is deleted after printing. The more difficulty in data reconstruction leads to the higher security strength. The security strength may be determined by the difficulty in detachment of the device from the authentication printing apparatus. In the authentication printing apparatus equipped with the storage device, the restrictions may be set on the access to the storage device detached from the authentication printing apparatus. The high security strength may be set for the structure of prohibiting the access to the data stored in the storage device detached from the authentication printing apparatus.

In another preferable application of the authentication printing apparatus, the authentication printing restriction module refers to the obtained attachment information and causes the print job to be executed by a another printing apparatus other than the authentication printing apparatus, as the restriction of the print job.

When the authentication printing apparatus selected by the user for the print job has the restriction of the authentication printing process, the authentication printing apparatus is not used for the print job but another printing apparatus is used for printing. This arrangement allows the print job to be performed by another printing apparatus under restriction of the authentication printing process in the authentication printing apparatus originally selected by the user for the print job, thus ensuring the good balance between the high security and the easy performance of the print job.

The another printing apparatus may be any of printing apparatuses satisfying various conditions given below.

The another printing apparatus may be a printing apparatus determined to have no restriction of the authentication printing process and designed to be an identical model with that of the authentication printing apparatus or to be a model of equivalent or higher performance than that of the authentication printing apparatus. The use of the printing apparatus of the same model as or the equivalent or higher model than the authentication printing apparatus selected by the user for the print job ensures the user's desired print result. This arrangement desirably avoids the user's undesired print result, for example, black and white printing against the user's requirement for color printing.

The another printing apparatus may be a printing apparatus determined to have no restriction of the authentication printing process and set ready for an immediate printing operation. The another printing apparatus may be a printing apparatus determined to have no restriction of the authentication printing process and registered in advance as an alternative in the case where the authentication printing apparatus is unusable for printing. These arrangements assure the printing operation without much delay.

The another printing apparatus may be a printing apparatus determined to have no restriction of the authentication printing process and located near to the authentication printing apparatus. The printing apparatus located near to the authentication printing apparatus is used for printing. The use can thus readily collect the print result.

The technique of the invention is not restricted to the authentication printing apparatus comprising any of the arrangements discussed above but may also be constructed as an authentication printing system.

According to another aspect, the invention is also directed to an authentication printing system configured to perform a printing operation on completion of authentication in response to a print request. The authentication printing system includes: multiple printing apparatuses, each arranged to receive a print job and perform a printing operation of print data specified by the print job; a print data storage device configured to store the print data specified by the print job; and an authentication device configured to, in response to the print request for the print job to the printing apparatus, authenticate the print request and cause one of the multiple printing apparatuses to perform an authentication printing process of executing the print job and printing the specified print data. The multiple printing apparatuses, the print data storage device, and the authentication device are mutually connected via a network. The authentication printing system further has: an attachment information acquisition module configured to obtain attachment information regarding attachment of a preset device to the printing apparatus; and an authentication printing restriction module configured to, in response to reception of the print request, refer to the obtained attachment information and restrict the authentication printing process according to the attachment information regarding attachment of the preset device.

In the authentication printing system according to this aspect of the invention, the multiple printing apparatuses, the print data storage device, and the authentication device are interconnected via the network. The authentication printing system of this configuration has the sufficient convenience and has the little possibility for leakage of information.

According to still another aspect, the invention is further directed to an authentication server configured to perform an authentication operation in response to a request from a printing apparatus connected with the authentication server via a network. The authentication server includes: an authentication request receiving module configured to receive authentication information that is output in response to a print request of a printing operation with the printing apparatus and includes attachment information regarding attachment of a preset device to the printing apparatus; and an authentication restriction module configured to refer to the received authentication information and prevent completion of at least part of the authentication operation according to the attachment information of the preset device, thereby restricting the printing operation with the printing apparatus.

The technique of the invention is not restricted to the authentication printing apparatus comprising any of the various arrangements, the authentication printing system, or the authentication server discussed above but is also actualized by diversity of other applications, for example, an authentication printing control method, an authentication printing method, and an authentication method, as well as programs causing the computer to implement the functions of the authentication printing control method, the authentication printing method, and the authentication method.

BRIEF DESCRIPTION OF THE DRAWINGS

FIG. 6 shows one example of authentication data in correlation to user ID;

FIG. 7 shows one example of authentication;

FIG. 10 shows one example of a spooler management table used to manage spooled print data;

FIG. 13 shows one example of a security strength value computation table;

FIG. 14 shows value ranges of security strength;

FIG. 15 shows one example of security level;

DESCRIPTION OF THE PREFERRED EMBODIMENTS

A. Schematic Configuration of Authentication Printing System

Figure 1:
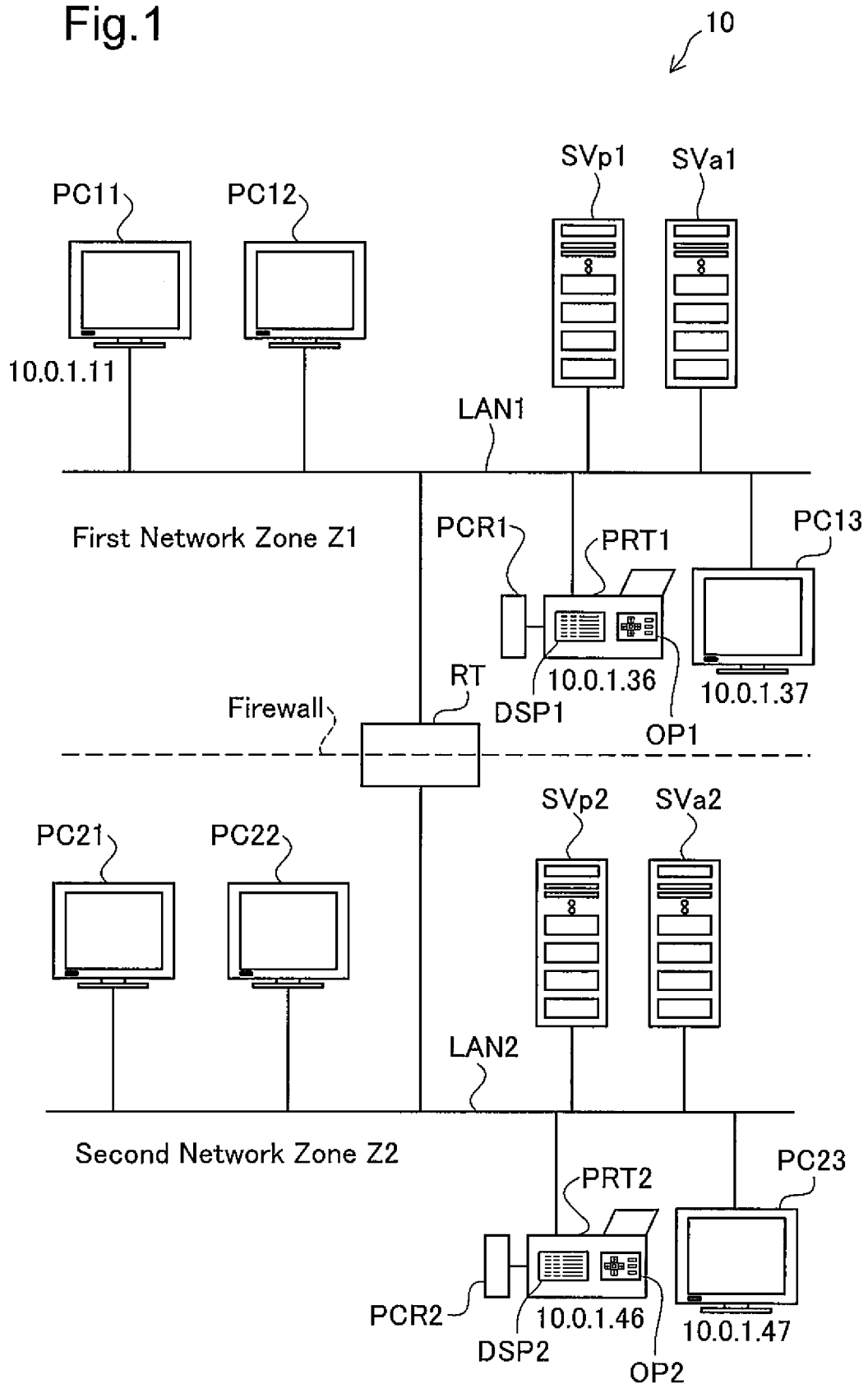
FIG. 1 schematically illustrates the configuration of an authentication printing system in a first embodiment of the invention.

FIG. 1 schematically illustrates the configuration of an authentication printing system 10 in a first embodiment of the invention. The authentication printing system 10 includes a first network zone Z1 connected by means of a local area network LAN1, a second network zone Z2 connected by means of a local area network LAN2, and a router RT arranged to interconnect the two network zones Z1 and Z2 across a firewall.

In the first network zone Z1, three terminals PC11, PC12, PC13, one printer PRT1, one printer server SVp1, and one authentication server SVa1 are mutually connected by the local area network LAN1. In the second network zone Z2, three terminals PC21, PC22, and PC23, one printer PRT2, one printer server SVp2, and one authentication server SVa2 are mutually connected by the local area network LAN2.

Figure 2:
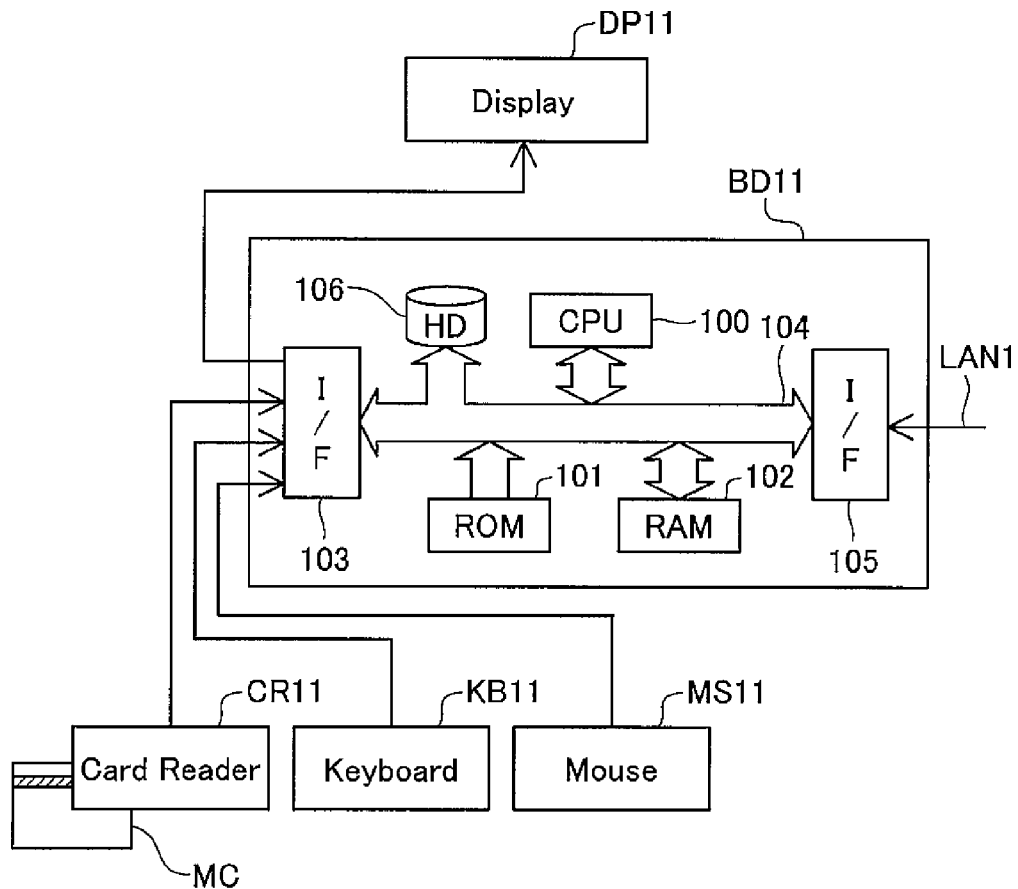
FIG. 2 is a functional block diagram of a terminal included in the authentication printing system of the embodiment.

FIG. 2 is a functional block diagram of the terminal PC11 in the embodiment. The terminal PC11 includes a display DP11, a main body BD11, a keyboard KB11, a mouse MS11, and a card reader CR11. The other five terminals PC12, PC13, PC21, PC22, and PC23 have the same structures as that of the terminal PC11 in the embodiment. The main body BD11 has a CPU 100 configured to control the operations of the terminal PC11, as well as memories ROM 101 and RAM 102, an interface circuit (I/F) 103 for peripheral equipment, an interface circuit (I/F) 105 for network, and a hard disk (HD) 106. The CPU 100, the memories ROM 101 and RAM 102, the HD 106, and the interface circuits 103 and 105 are mutually connected by an internal bus 104. The interface circuit 103 is connected with the display DP11, the keyboard KB11, the mouse MS11, and the card reader CR11. The CPU 100 transmits data to and from the peripheral equipment via the internal bus 104 and the interface circuit 103.

A cable of the local area network LAN1 is connected to the interface circuit 105 of each terminal for network. Such connection enables the CPU 100 to transmit packets to and from the other terminals and the servers via the local area network LAN1. In the system of this embodiment, the respective terminals have USB connection. The function of BIOS is limited to prevent USB connection of any mass storage devices. Each terminal has no interface for external storage media, such as a flexible disk. The limited USB connection and the absence of the interface for external storage media prevent data from being written from the terminal into the flexible disk or into a memory connected by USB connection. This structure effectively reduces the potential for information leakage from the terminal. These terminals may be connected by an interface dedicated for a keyboard or a mouse, instead of USB connection.

Figure 3:
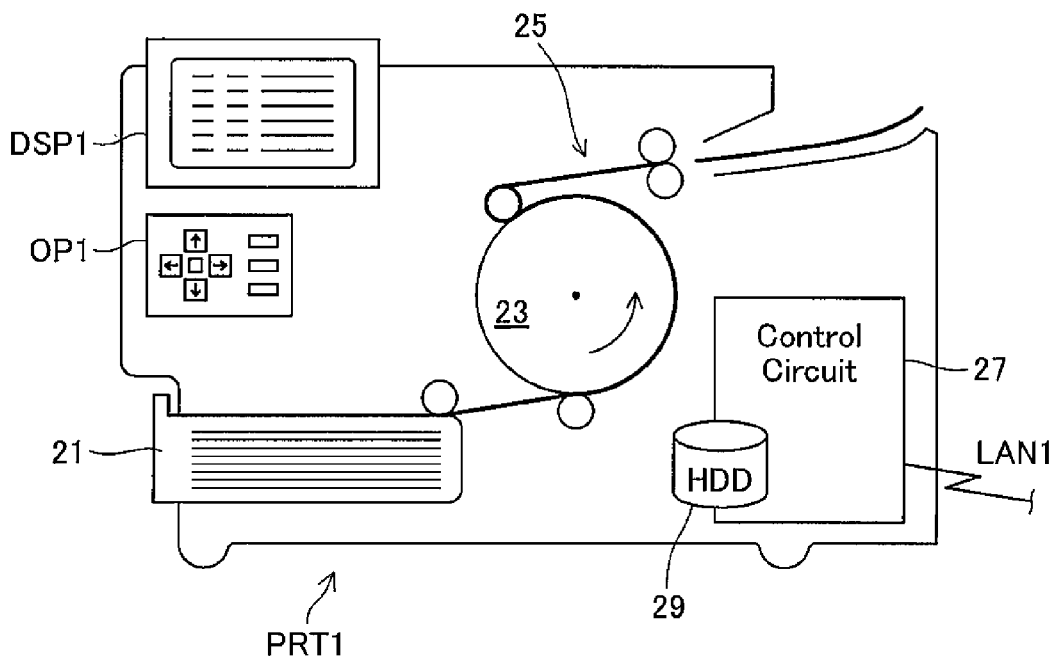
FIG. 3 shows the schematic structure of a printer included in the authentication printing system of the embodiment.

FIG. 3 shows the schematic structure of the printer PRT1 in the system of the embodiment. Although not being specifically illustrated, the other printer PRT2 has the same structure as that of the printer PRT1. The printer PRT1 is a known page printer and includes a paper cassette 21, a print engine 23 including a photosensitive drum, a paper feed mechanism 25, and a control circuit 27 including an interface circuit for the network. The control circuit 27 includes a CPU, a ROM, and a RAM in a similar manner to the structure of the terminal PC11 shown in FIG. 2. Magnetic card readers PCR1 and PCR2 for authentication are respectively attached to the printers PRT1 and PRT2 as shown in FIG. 1 and connected to the internal control circuits 27 of the printers PRT1 and PRT2. The printers PRT1 and PRT2 respectively have liquid-crystal display panels DSP1 and DSP2 and operation panels OP1 and OP2 for data input as shown in FIGS. 1 and 3. The liquid-crystal display panels DSP1 and DSP2 and the operation panels OP1 and OP2 are also respectively connected to the internal control circuits 27 of the printers PRT1 and PRT2. Each of the liquid-crystal display panels DSP1 and DSP2 shows various letter or character strings as messages, as well as an ON/OFF button and other operation buttons. Each of the operation panels OP1 and OP2 has multiple operation keys, for example, left, right, up, and down arrow keys and 'Set' key. Although only a limited number of operation keys are physically provided on the operation panel OP1 (OP2), the combination with the display on the liquid-crystal display panel DSP1 (DSP2) allows diversity of operations. For example, the user operates the arrow keys to successively highlight one of multiple options displayed on the liquid-crystal display panel DSP1 (DSP2) and operates the 'Set' key to select a desired option currently highlighted on the display. One modified structure does not use the operation panel OP1 (OP2) but provides a touch panel on the liquid-crystal display panel DSP2 (DSP2) to allow the user's direct selection of a desired option by simple touching.

Each of the printers PRT1 and PRT2 has a dedicated port connectable with a hard disk drive (HDD) 29. In the system of this embodiment, the HDD 29 is connected with an ATA interface connector to readily increase the storage capacity of the printer PRT1 or PRT2. The connection technique of the hard disk drive depends upon the specification of the printer. In the printer PRT1 (PRT2) equipped with the HDD 29, the control circuit 27 temporarily stores print data received via the network into the HDD 29 and then prints the stored print data. In the printer PRT1 (PRT2) without the HDD 29, on the other hand, the control circuit 27 successively expands print data received via the network in the internal RAM, prints the expanded print data, and immediately deletes the expanded print data on completion of printing. The control circuit 27 identifies the presence or the absence of the HDD 29 in the printer PRT1 (PRT2), based on information obtained from a management information base (MIB) of the printer PRT1 (PRT2). The control circuit 27 recognizes the presence of the HDD 29 based on the information obtained from the MIB at a power-on self-check time and subsequently checks its presence at regular intervals. The control circuit 27 sets the check result to a specific flag. The control circuit 27 identifies the presence or the absence of the HDD 29 at any arbitrary time by referring to the setting of the specific flag. An external device, for example, the authentication server SVa1, may inquire the presence or the absence of the HDD 29 in the printer PRT1 (PRT2) according to a preset procedure. The hard disk drive in the printer is generally used to store print data temporarily or for a predetermined time period. The hard disk drive in a specific printer, for example, a PostScript printer, is used to only expand font data. In this latter application, the print data is not stored in the internal hard disk drive of the printer but is successively expanded in the RAM to be printed and is immediately deleted on completion of printing.

B. Outline of Authentication-Based Printing

Figure 4:
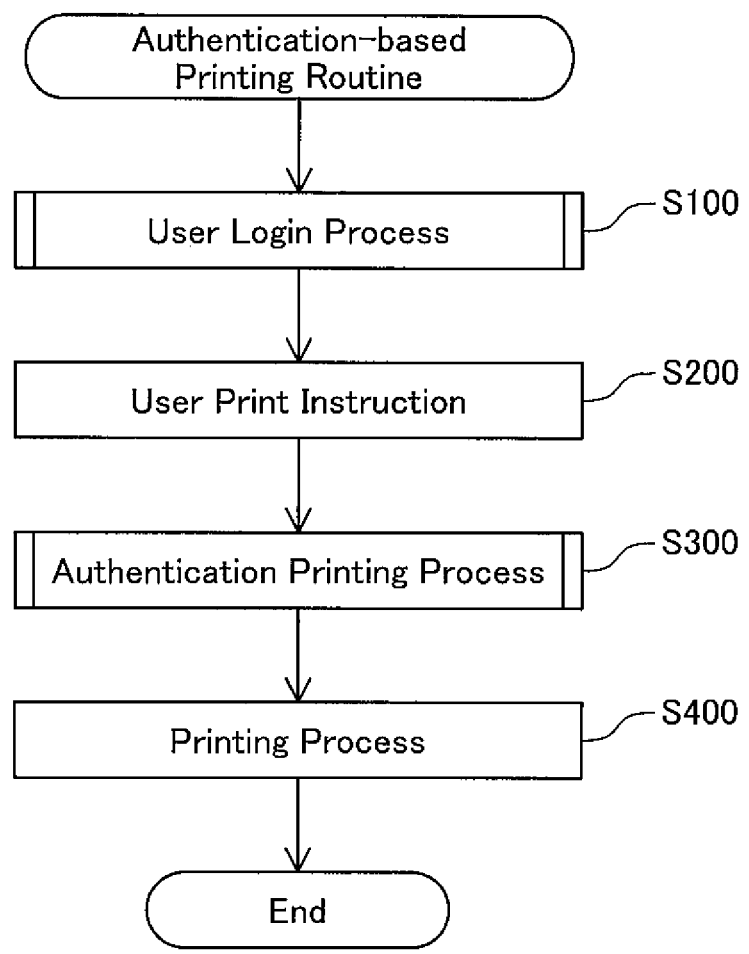
FIG. 4 is a flowchart showing the general outline of an authentication-based printing routine in the first embodiment.

Some modes of carrying out the invention are discussed below with reference to the accompanied drawings. The outline of authentication-based printing process performed by the authentication printing system 10 is discussed first with reference to the flowchart of FIG. 4. The general processing flow of FIG. 4 represents the essential procedure required for authentication printing. At a start of the authentication-based printing process, the user desiring a printing operation with a selected printer operates a specific terminal to perform a user login process (step S100). According to a concrete procedure, the user activates one of the terminals PC11 to PC13 (or the terminals PC21 to PC23) connecting with the authentication printing system 10 and logs into the authentication printing system 10. In the description below, it is assumed that the user activates the terminal PC11 to log into the authentication printing system 10.

The terminal PC11 activated by the user automatically executes a pre-installed login program and starts a series of processing for system login. The details of the user login process are explained with reference to the flowchart of FIG. 5. At a start of the user login process, according to the left flow of FIG. 5, the terminal PC11 shows a preset message on the display DP11 of the terminal PC11 to ask the user to enter a user ID (user name) and swipe the user's own magnetic card MC through the magnetic card reader CR11 (step S101). In response to this message, the user operates the keyboard KB11 to enter the user ID and swipes the magnetic card MC through the card reader CR11. The terminal PC11 then inputs the user ID (step S102) and reads out authentication data recorded in advance in the magnetic card MC swiped through the card reader CR11 (step S103).

The terminal PC11 sends the input user ID and the authentication data read out from the magnetic card MC to the authentication server SVa1 via the network (step S104). FIG. 6 shows one example of the authentication data in correlation to the user ID. In this embodiment, the authentication data recorded in the magnetic card MC is used as a login password. One modification may use the data registered in the magnetic card MC as the user ID and ask the user to enter the login password through the operation of the keyboard KB11. Another method for the system login from the terminal PC11 may not use the magnetic card reader CR11 but may ask the user to directly enter both the user ID and the login password through the operation of the keyboard KB11.

Figure 5:
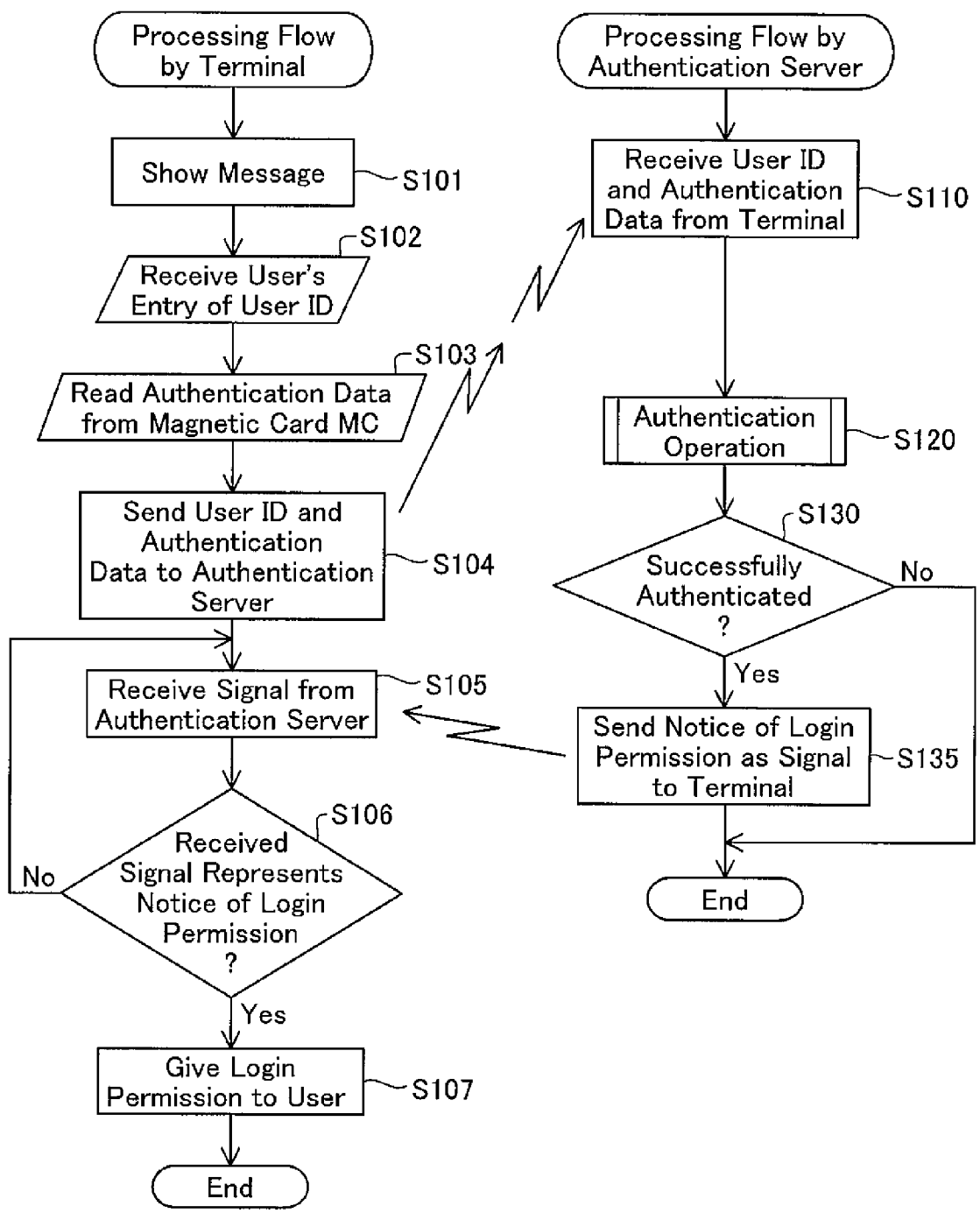
FIG. 5 is a flowchart showing the details of a user login process executed at step S100 in the authentication-based printing routine of FIG. 4.

In response to transmission of the user ID and the authentication data from the terminal PC11, the authentication server SVa1 executes a series of processing according to the right flow of FIG. 5. The authentication server SVa1 receives the user ID and the authentication data registered in the magnetic card MC from the terminal PC11 (step S110) and authenticates the received user ID and authentication data (step S120). The authentication server SVa1 stores in advance a table representing user IDs of the users having login permission and authentication data recorded in magnetic cards MC owned and managed by the respective users. The authentication server SVa1 checks the user ID and the authentication data received from the terminal PC11 via the network against the registered data in the table and verifies whether the user currently operating the terminal PC11 is a user having login permission to the authentication printing system 10. FIG. 7 shows one example of such authentication. For example, in response to the user's entry of a user ID 'Suzuki', the authentication server SVa1 checks the authentication data received as the login password against the authentication data registered in correlation to the user ID 'Suzuki' in the table and gives a result of successful authentication 'OK' simultaneously with extracting a system permission ID '00111' from the table. The system permission ID is given to permit the user to utilize the authentication printing system 10. In another example, in response to the user's entry of a user ID 'Takahashi', the authentication server SVa1 checks the authentication data received as the login password against the contents of the table. Since the table has no authentication data registered in correlation to the user ID 'Takahashi', the authentication server SVa1 gives a result of failed authentication 'NG'. In this case, naturally no system permission ID is extracted from the table.

Upon successful authentication of the user with the user ID and the authentication data (step S130: yes), the authentication server SVa1 sends back a signal representing a notice of login permission to the terminal PC11 (step S135). According to a concrete procedure, the authentication server SVa1 sends back the authentication result 'OK' and the system permission ID representing permission for printing with the authentication printing system 10 to the terminal PC11 as shown in FIG. 7. The terminal PC11 receives the signal from the authentication server SVa1 (step S105) and identifies whether the received signal represents the notice of login permission (step S106). Upon identification of the notice of login permission, the terminal PC11 gives a login permission and allows the user to use the terminal PC11 (step S107). The user can then freely operate the terminal PC11 with the keyboard KB11 and the mouse MS11 to browse data open to the user and to newly generate data. Unless the terminal PC11 receives the signal representing the notice of login permission from the authentication server SVa1, the terminal PC11 repeats the receiving process of step S105 and does not allow the user to freely use the terminal PC11.

Referring back to the authentication-based printing routine of FIG. 4, this completes the user login process performed by the terminal PC11 and the authentication server SVa1 (step S100). The logged-in user then operates the terminal PC11 to create or browse any document, spreadsheet, or image and gives a print instruction for printing a desired document, spreadsheet, or image (step S200). The print instruction is given to activate the printer PRT1 or the printer PRT2 for a printing operation. In response to the user's print instruction, the printer server SVp1 spools print data sent from the terminal PC11 with the authentication data (system permission ID) for identifying the user who gives the print instruction, in the form of a print job.

Figure 8:
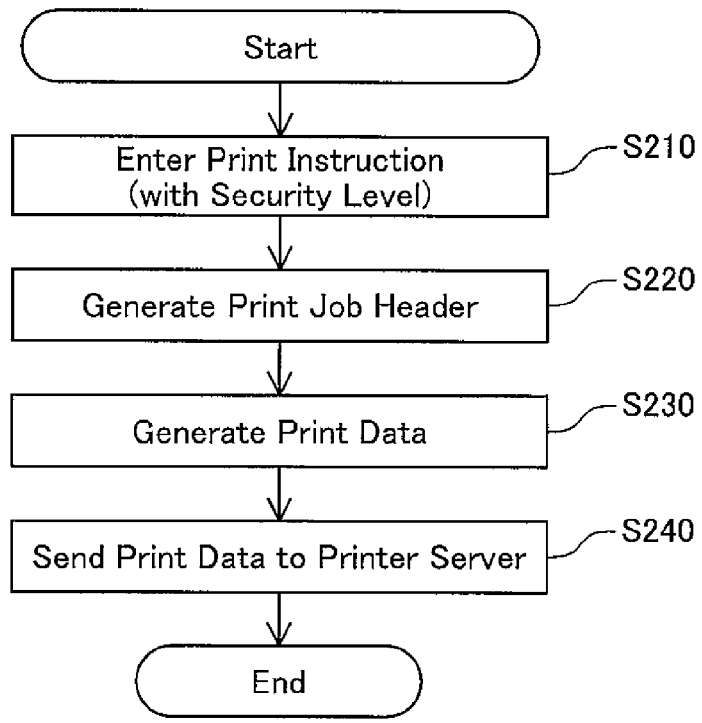
FIG. 8 is a flowchart showing a series of processing executed by the terminal in response to a user's print instruction.

FIG. 8 is a flowchart showing a series of processing executed by the terminal PC11 in response to the user's print instruction. The terminal PC11 receives the user's entries of a print instruction and a security level of, for example, a document selected for printing (step S210). The security level represents the confidential level of the selected document for printing and is classified into three stages, 'high', 'medium', and 'low' in this embodiment. The security level may be specified according to the post in a company, for example, 'for the general managers and the higher only' and 'for the section chiefs and the higher only' or may be specified according to the access privilege to documents, for example, 'privilege A' and 'privilege B'. The security level may also be specified in the organization unit like 'for department staff only' or 'for internal use only'. The time period may be set for the secrecy like 'until Feb. 18, 2009'. The application of this security level will be discussed later.

The terminal PC11 subsequently generates a print job header with regard to the document selected for printing (step S220). The print job header includes print job attribute information regarding printing-related attributes, for example, the security level of the document, in addition to bibliographical information like the date and the time of the user's print instruction, the name of the user who gives the print instruction, and the system permission ID. The details of the print job attribute information will be discussed later. The terminal PC11 then generates print data (step S230) and sends the generated print data to the printer server SVp1 (step S240).

Figure 9:
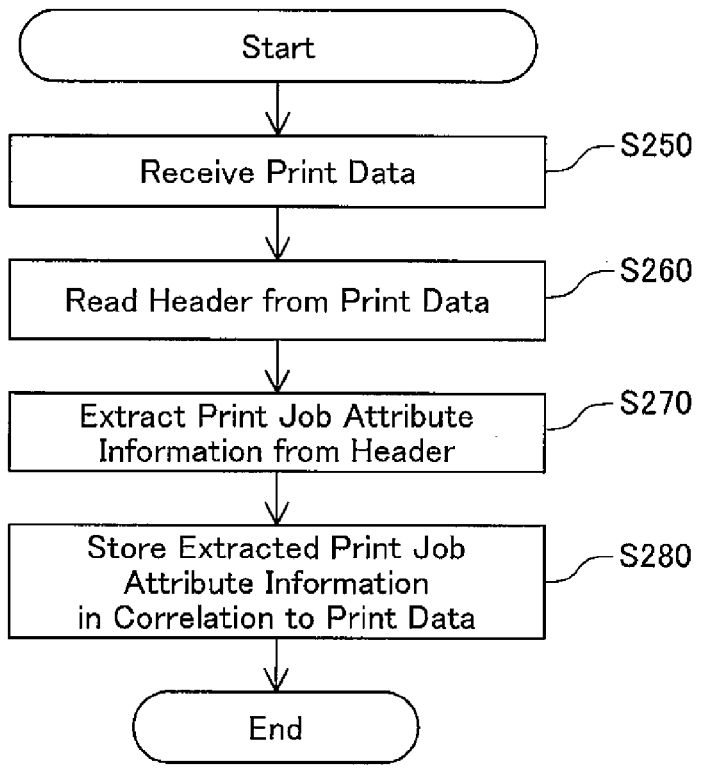
FIG. 9 is a flowchart showing a series of processing executed by a printer server in response to the user's print instruction.

FIG. 9 is a flowchart showing a series of processing executed by the printer server SVp1 in response to transmission of print data from the terminal PC11. The printer server SVp1 receives the print data from the terminal PC11 (step S250), reads the print job header from the received print data (step S260), and analyzes the print job header to extract the print job attribute information and the bibliographical information from the print job header (step S270). The printer server SVp1 spools the extracted print job attribute information correlated to the print data (step S280). A concrete spooling procedure encrypts the received print data and spools the encrypted print data in an internal hard disk drive of the printer server SVp1. The encrypted and spooled print data is correlated to the authentication data and is stored in the form of a spooler management table shown in FIG. 10. The spooler management table includes the print job attribute information as shown in FIG. 10.

The printer server SVp1 does not allow the spooled print data to be output to the printer PRT1 or PRT2 until completion of an authentication printing process discussed later. Namely a printout is not immediately output from the printer PRT1 or PRT2 in response to the user's print instruction given through the operation of the terminal PC11. After giving the print instruction, the user logs out from the terminal PC11 and moves to the selected printer PRT1 or PRT2.

Referring back to the authentication-based printing routine of FIG. 4, the user logged out from the terminal PC11 carries the magnetic card MC and moves to the printer PRT1 or PRT2 selected for printing to perform an authentication printing process (step S300). The authentication printing process allows a printing operation only after successful authentication of the user on the printer side and is especially preferable, for example, in the case of printing classified documents or in the case of sharing a high-performance printing apparatus by multiple users. When a printer is located away from a terminal currently operated by the user to give a print instruction, there is a risk that a printout of a classified document may be leaked to a third person before the user reaches the location of the printer. In order to prevent such potential leakage, the actual printing operation is started only after successful authentication of the user on the printer side. The details of the authentication printing process will be discussed later. The user operates the printer PRT1, for example, to perform the authentication printing process with the magnetic card MC. Upon successful authentication of the user on the printer side, the printer PRT1 performs an actual printing operation (step S400). At this moment, the printer server SVp1 decrypts the print data, which is encrypted and spooled in the printer server SVp1 in response to the user's print instruction from the terminal PC11. The decrypted print data is sent to the printer PRT1 via the local area network LAN1 to be printed. The decryption may be performed by the printer PRT1, instead of the printer server SVp1.

C. Outline of Authentication Printing Process

The authentication printing system 10 of the embodiment performs the authentication printing process to ensure the high security for printing as discussed below. Prior to the detailed description of the authentication printing process, data transmission between the terminal PC11, the authentication server SVa1, and the printer server SVp1 in the authentication printing system 10 of the embodiment is explained. The flowchart of FIG. 11 mainly shows basic data transmission in the authentication printing process executed at step S300 in the authentication-based printing routine of FIG. 4. The authentication printing process includes three cooperative processing flows respectively performed by the printer PRT1, the authentication server SVa1, and the printer server SVp1. The left flow shows a series of printing process (steps S311 to S318) performed by the printer PRT1 equipped with the magnetic card reader PCR1. The middle flows shows a series of authentication process (steps S331 to S340) performed by the authentication server SVa1 in response to an authentication request from the printer PRT1. The right flow shows a series of print data transmission process (steps S351 to S357) performed by the printer server SVp1 to decrypt and output print data, which is encrypted and spooled in the printer server SVp1 in response to the user's print instruction, to the printer PRT1. The three cooperative processing flows in the printing authentication process are discussed with reference to the flowchart of FIG. 11.

The user giving a print instruction through the operation of the terminal PC11 swipes the magnetic card MC through the magnetic card reader PCR1 of the printer PRT1 to obtain a printout from the printer PRT1. The printer PRT1 reads out the registered authentication data from the magnetic card MC (step S311) and sends the authentication data read from the magnetic card MC to the authentication server SVa1 (step S312).

The printer PRT1 sends a packet including the authentication data read from the magnetic card MC with a header representing the address of the authentication server SVa1 as the receiver to the local area network LAN1 (step S312). The authentication server SVa1 recognizes itself as the destination of the packet including the authentication data based on the header of the packet and receives the authentication data (step S331). The authentication server SVa1 subsequently analyzes the received authentication data and performs user authentication to check the received authentication data against registered authentication data of the users having login permission (step S334). Upon successful user authentication that the received authentication data matches with registered authentication data regarding one of the users (step S335), the authentication server SVa1 determines the successful authentication of the user and outputs a print instruction to the printer server SVp1 (step S340). In the event of failed user authentication that the received authentication data does not match with any registered authentication data of the users (step S335), the authentication server SVa1 immediately terminates the processing flow of the printing authentication process. In this case, no print instruction is sent from the authentication server SVa1 to the printer server SVp1. A predetermined abnormal time operation may be performed in the event of such failed authentication. The abnormal time operation may interrupt or stop the respective processing flows performed by the printer and the servers or may inform the user of the occurrence of some abnormality, for example, by an alarm sound or an alarm message.

Upon successful authentication, the authentication server SVa1 sends a packet including the print instruction with a header representing the address of the printer server SVp1 as the receiver to the local area network LAN1 (step S340). The print instruction has the authentication data including the system permission ID (see FIG. 7), in addition to information for specifying object print data to be printed. The printer server SVp1 recognizes itself as the destination of the packet including the print instruction based on the header of the packet and receives various data included in the print instruction (step S351). The printer server SVp1 subsequently identifies whether any print data in correlation to matching authentication data including a matching system permission ID with the authentication data included in the received print instruction is spooled in the hard disk (step S352). As discussed previously with reference to FIG. 10, the printer server SVp1 spools the encrypted print data in correlation to the authentication data. The printer server SVp1 accordingly retrieves the encrypted and spooled print data based on the received authentication data and decrypts the retrieved print data (step S354). The printer server SVp1 sends the decrypted print data PD to the printer PRT1 (step S355).

The decrypted print data PD sent to the local area network LAN1 is divided into multiple packets with a header representing the address of the printer PRT1 as the receiver. The printer PRT1 successively receives the multiple packets of the decrypted print data PD from the local area network LAN1 (step S316), reconstructs the received multiple packets into image data, and performs an actual printing operation of the reconstructed image data (step S317). This series of processing of decrypting and sending the print data, receiving the decrypted print data, and printing the received print data is repeated until completion of transmission and printing of all the print data (steps S318 and S357). On completion of such decryption, transmission, reception, and printing of all the print data, the printer PRT1 completes the printing operation and returns to standby. The printer server SVp1 also returns to the initial state.

D. Details of Authentication Printing Process

Figure 11:
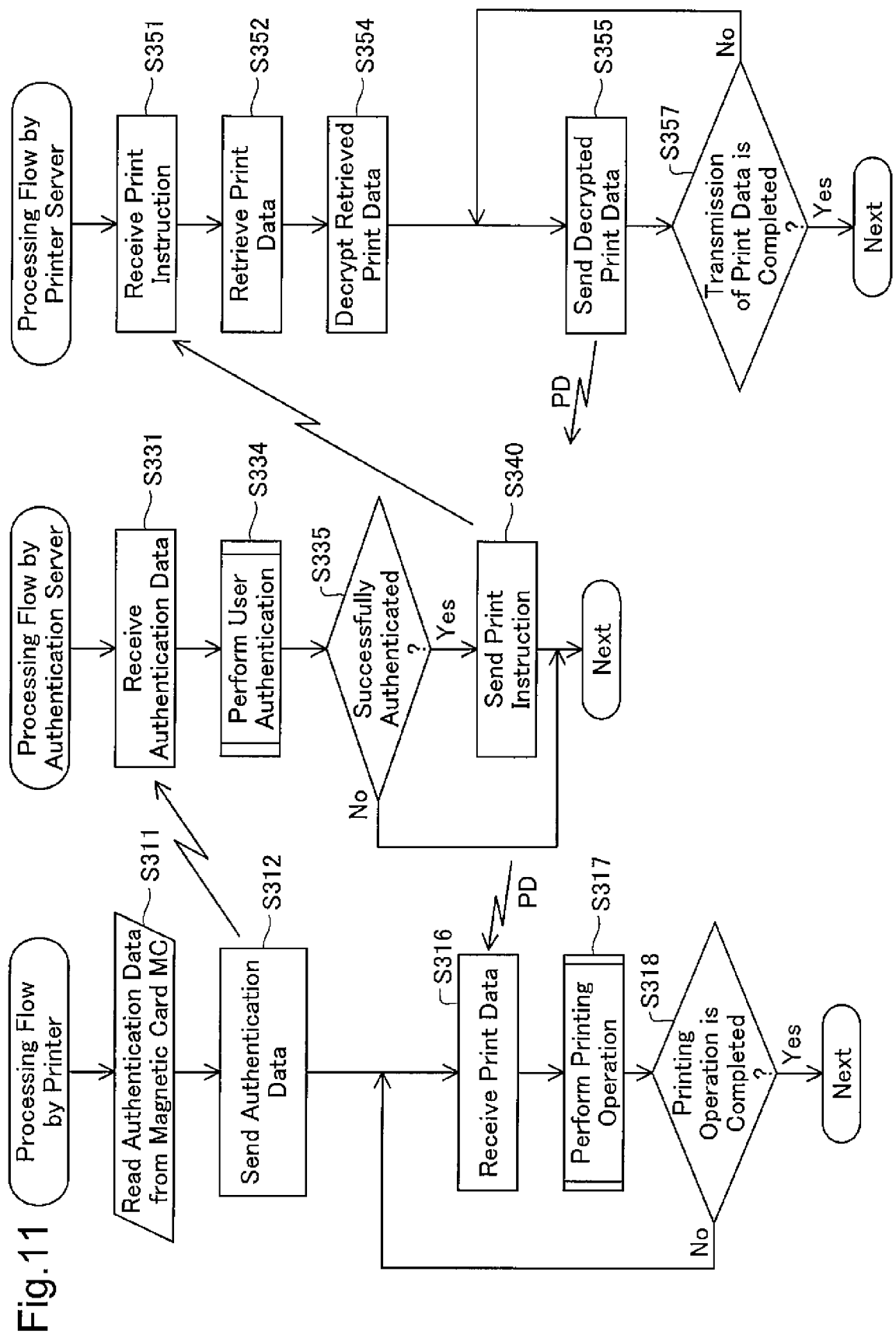
FIG. 11 is a flowchart showing the outline of an authentication printing process executed at step S300 in the authentication-based printing routine of FIG. 4.
Figure 12:
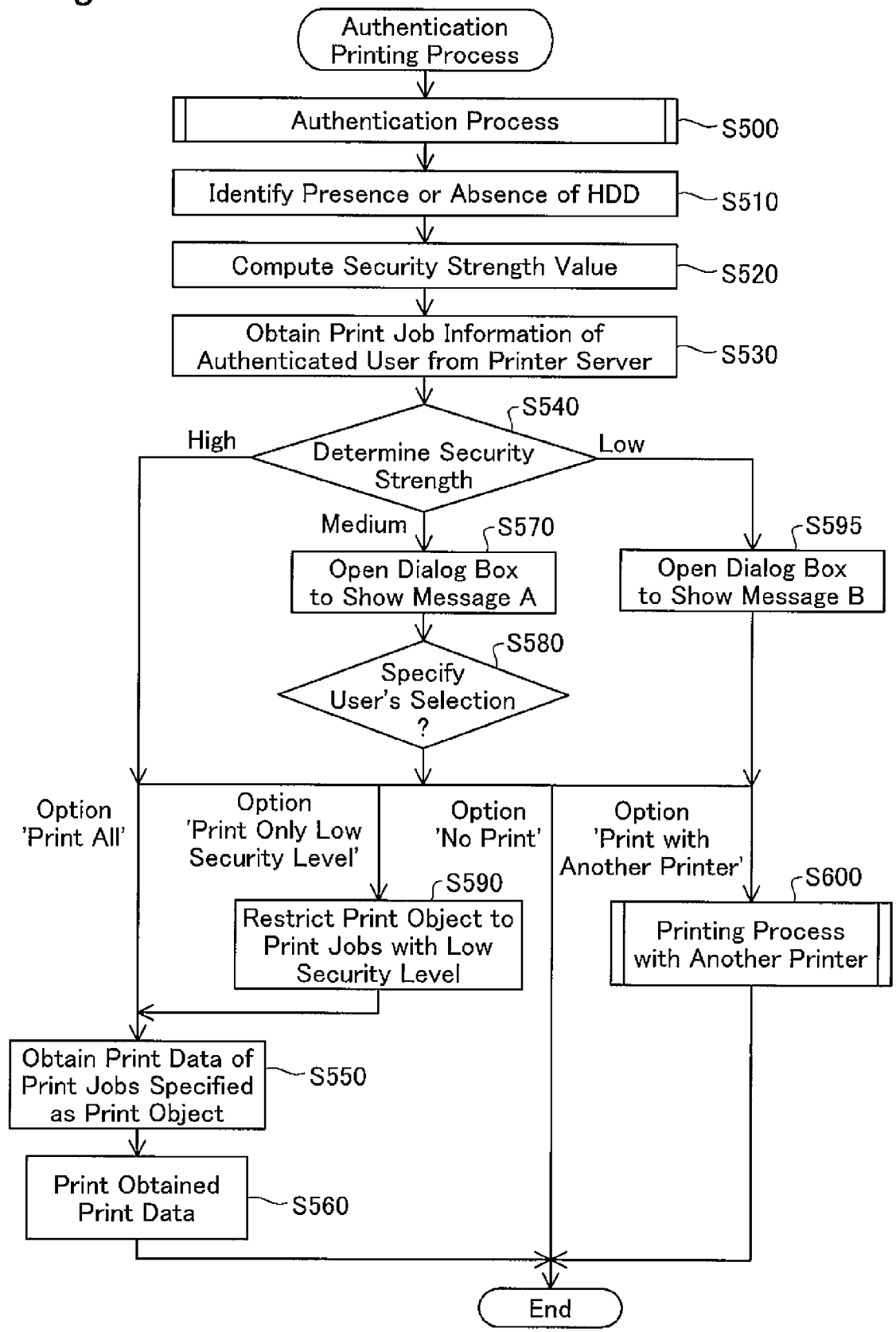
FIG. 12 is a flowchart showing the details of the authentication printing process of the first embodiment.

This is the basic processing flows for printing executed by the terminal PC11, the authentication server SVa1, and the printer server SVp1. The following describes the details of the authentication printing process performed to ensure the high security in the authentication printing system 10. FIG. 12 is a flowchart showing the details of the authentication printing process executed for the high security by the printer PRT1 (PRT2), while the flowchart of FIG. 11 shows the transmission of data between the terminal PC11, the authentication server SVa1, and the printer server SVp1 in the authentication printing process.

In the authentication printing process, the control circuit 27 of the printer PRT1 first performs an authentication process (step S500). This authentication process is identical with the processing of steps S311 and S312 discussed above with reference to the flowchart of FIG. 11. An addition authentication process of authenticating the magnetic card reader PCR1 is effective to prevent a dishonest act of replacing the magnetic card reader PCR1 with a low-security device. After the authentication process, the control circuit 27 identifies the presence or the absence of the hard disk drive (HDD) in the printer PRT1 itself (step S510). The control circuit 27 detects the presence of the HDD and sets the detection result to the specific flag. The presence of the HDD is thus readily identifiable by simply referring to the setting of the specific flag.

The control circuit 27 subsequently computes a security strength value (step S520). The security strength value is a numerical representation of the security strength of the printer PRT1 against potential information leakage. The security strength value may be computed according to a table shown in FIG. 13. In this illustrated example, the security strength value is set according to the data storage level of the HDD in the printer PRT1 and the encryption level of the print data. A maximum value '10' is set to the security strength value in the specification without the HDD or in the specification with the HDD controlled not to store the print data even temporarily. A value '−5' is set to the security strength value in the specification with the HDD controlled to keep the print data stored on completion of printing. In the specification with the HDD controlled to store the print data only in an encrypted form, values '3', '2', and '1' are set corresponding to the encryption level 'high', 'medium', and 'low'. A minimum value '−10' is set to the security strength value in the unknown case without any information on the data storage level of the HDD.

The security strength value may be computed according to only the table of FIG. 13 or may be computed in combination with another condition, for example, a numerical representation of the difficulty in opening the casing of the printer for detachment of the HDD or a numerical representation of the type of the authentication device (the magnetic card reader PCR1 in the embodiment) provided in the printer PRT1. In the former condition, a large value may be set to the security strength value, for example, in the structure with a specific lock that requires unlocking to open the casing of the printer for detachment of the HDD. In the latter condition, a large value may be set to the security strength value, for example, for the authentication device requiring fingerprint authentication or vein authentication. The final security strength value is determined as the sum of the numerical values set according to the respective conditions. The numerical values set according to the respective conditions may be summed up with some weighting.

After computation of the security strength value, the control circuit 27 of the printer PRT1 obtains print job information of the user authenticated by the authentication process (step S500) from the spooler management table in the printer server SVp1 (step S530). The print job information specifies the print data stored in correlation to the authentication data of the user who gives the print instruction in the spooler management table shown in FIG. 10. The print job information includes the print job attribute information representing the security level of the print data.

The control circuit 27 of the printer PRT1 then determines the security strength of the printer PRT1 (step S540). The determination of the security strength is based on the security strength value computed at step S520 in this embodiment. The value ranges of the security strength used for this determination are shown in the table of FIG. 14. The security strength is determined as 'high' for the security strength value range of not less than 10, as 'medium' for the security strength value range of not less than 5 but less than 10, and as 'low' for the security strength value range of less than 5.

Upon determination of the 'high' security strength (step S540), for example, in the specification without the HDD or in the specification with the HDD controlled not to store the print data even temporarily, all the print data stored in the printer server SVp1 are determined to be printable. All the documents or print jobs specified by the print instruction given by the authenticated user to the printer PRT1 are thus specifiable as the print object. The control circuit 27 accordingly obtains the print data of the specified print jobs from the printer server SVp1 (step S550). The specification of the print jobs and the acquisition of the print data are readily performed by simply referring to the table of FIG. 10. The printer PRT1 then prints the obtained print data (step S560). This series of processing is equivalent to the processing flow of steps S316 to S318 by the printer PRT1 shown in FIG. 11.

Upon determination of the 'medium' security strength (step S540), the control circuit 27 selectively performs one of multiple different printing processes according to the security level of the print data represented by the print job attribute information. FIG. 15 shows one example of the security level of documents. In this illustrated example, the 'high' security level is set to documents to be kept secret from outside department (for example, pay list). The 'medium' security level is set to documents to be kept secret from outside company (staff-only documents). The 'low' security level is set to any non-classified documents. Any other criterion may be adopted for the classification of the security level. For example, the security level of documents may be rated corresponding to the disclosure level like 'for the general managers and the higher only' and 'for the section chiefs and the higher only'.

In order to select the different printing process according to the security level of the print data, the control circuit 27 opens a dialog box to show the following message A on the liquid crystal display panel DSP1 of the printer PRT1 (step S570):
Message A: 'This printer is equipped with a hard disk drive. Would you like to print?'

The control circuit 27 also shows possible options 'print all', 'print only low security level', 'print with another printer', and 'no print' after the message A on the liquid crystal display panel DSP1 (step S570). The control circuit 27 waits for and specifies the user's selection on the operation panel OP1 (step S580).

On the user's selection of the option 'print only low security level', the control circuit 27 restricts the print object to print jobs having the 'low' security level (step S590), obtains the print data of only the print jobs having the 'low' security level from the printer server SVp1 (step S550), and controls the printer PRT1 to print the obtained print data (step S560).

On the user's selection of the option 'print with another printer', the control circuit 27 performs a printing process with another printer connecting with the network (step S600). On the user's selection of the option 'no print', the control circuit 27 does not perform any printing process and immediately exits from this authentication printing process. The printing process with another printer (step S600) will be discussed in detail with reference to the flowchart of FIG. 16. This printing process with another printer (step S600) is also performed upon determination of the 'low' security strength (step S540). In response to determination of the 'low' security strength (step S540), the control circuit 27 opens a dialog box to show the following message B on the liquid crystal display panel DSP1 of the printer PRT1 (step S595), prior to the printing process with another printer (step S600):
Message B: 'This printer is equipped with a hard disk drive and has a potential for information leakage. Another printer should be used for printing.'

The authentication printing process of this embodiment unconditionally performs the printing process with another printer (step S600), when the user's selected printer has the 'low' security strength (step S540). One application may show possible options 'no print' and 'print with another printer' after the message B on the liquid crystal display panel DSP1 and ask the user to select a desired option.

The details of the printing process with another printer are described with reference to the flowchart of FIG. 16. The control circuit 27 searches for any other printers connecting with the network (step S610). When a printer server or any equivalent manages the printers connecting with the network, the control circuit 27 may ask the printer server about the presence of any other printers connecting with the network, instead of the own search. The control circuit 27 obtains the security strength values of the respective other printers found on the network (step S620). The control circuits of the respective printers compute the security strength values of the own printers. The control circuit 27 asks each of the printers found on the network about the security strength value and obtains the security strength value from each printer according to a preset procedure.

The control circuit 27 subsequently identifies whether any printer among the printers found on the network has the 'high' security strength (step S630). Upon identification of any printer having the 'high' security strength (step S630), the control circuit 27 opens a dialog box to show the following message C on the liquid crystal display panel DSP1 (step S640):
Message C: 'There is a high security-strength printer on the network. Would you like to transfer print data for printing?
  Printer Model: xxyyzz
  IP Address: 192.168.1.x
  Location: Center on $3^{rd}$ Floor'

The control circuit 27 also shows possible options 'transfer' and 'no transfer' after this message C (step S640). When the total area of the message and the options exceeds the screen area of the liquid crystal display panel DPS1, the message and the options may be displayed in multiple consecutive pages or may be scroll displayed. When there are multiple printers with the 'high' security strength as the potential transfer destination on the network, the control circuit 27 may show all these printers and ask the user to select one of the printers as the transfer destination or may automatically select the printer having the highest security strength value as a candidate of the transfer destination. Another application may specify a printer located nearest to the printer PRT1 originally selected by the user for printing and show the user the specified printer as a candidate of the transfer destination. When a printer server or any equivalent manages the printers and grasps the locations of the respective printers, the control circuit 27 may ask the printer server to specify a printer of the nearest location among printers having security strength values of not less than a preset reference value and show the user the specified printer as the transfer object.

The control circuit 27 then identifies the user's selection of the option on the operation panel OP1 (step S650). In response to the user's selection of the option 'transfer', the print data of the print job specified as the print object is obtained from the printer server SVp1 and is transferred to the printer selected as the transfer destination (step S660). In this case, the printer selected as the transfer destination has the sufficiently high security strength. The selected printer thus immediately starts printing the transferred print data upon successful authentication of the user. It is preferable that the printer of the no 'high' security strength does not mediate transfer of the print data but gives the printer server SVp1 identification information of the printer selected as the transfer destination. The print data is then directly transferred from the printer server SVp1 to the selected printer. In the case where the printer of the no 'high' security strength mediates transfer of the print data, the print data is not stored in the hard disk drive but is kept only in the RAM to be successively transferred to the selected printer.

When there is no printer having the 'high' security strength among the printers found on the network (step S630), on the other hand, the control circuit 27 opens a dialog box to show the following message D (step S670) and goes to NEXT to exits from this routine:

Message D: 'There is no printer of the high security strength. Printing is suspended'.

In this case, the printer PRT1 may request the printer server SVp1 to delete the stored print data of the print job specified as the print object. In another application, the print data of the specified print job may not be deleted but may be kept in the printer server SVp1 to be printed later with a printer of the 'high' security strength.

In the authentication printing system 10 of the first embodiment discussed above, when a printer selected by the user to print a specified print job is equipped with a hard disk drive and has the 'low' security strength, printing of the print job with the selected printer is not permitted. This arrangement effectively prevents leakage of information from the hard disk drive of the printer. The authentication printing system of this embodiment flexibly deals with the print job, for example, printing selected documents or printing with another printer of the high security strength on the network, according to the security strength of the printer in combination with the security level of the document (print job). This arrangement effectively enhances the convenience of the authentication printing system, while preventing leakage of information from a low-security storage device, such as a hard disk drive.

E. Modification of First Embodiment

Figure 17:
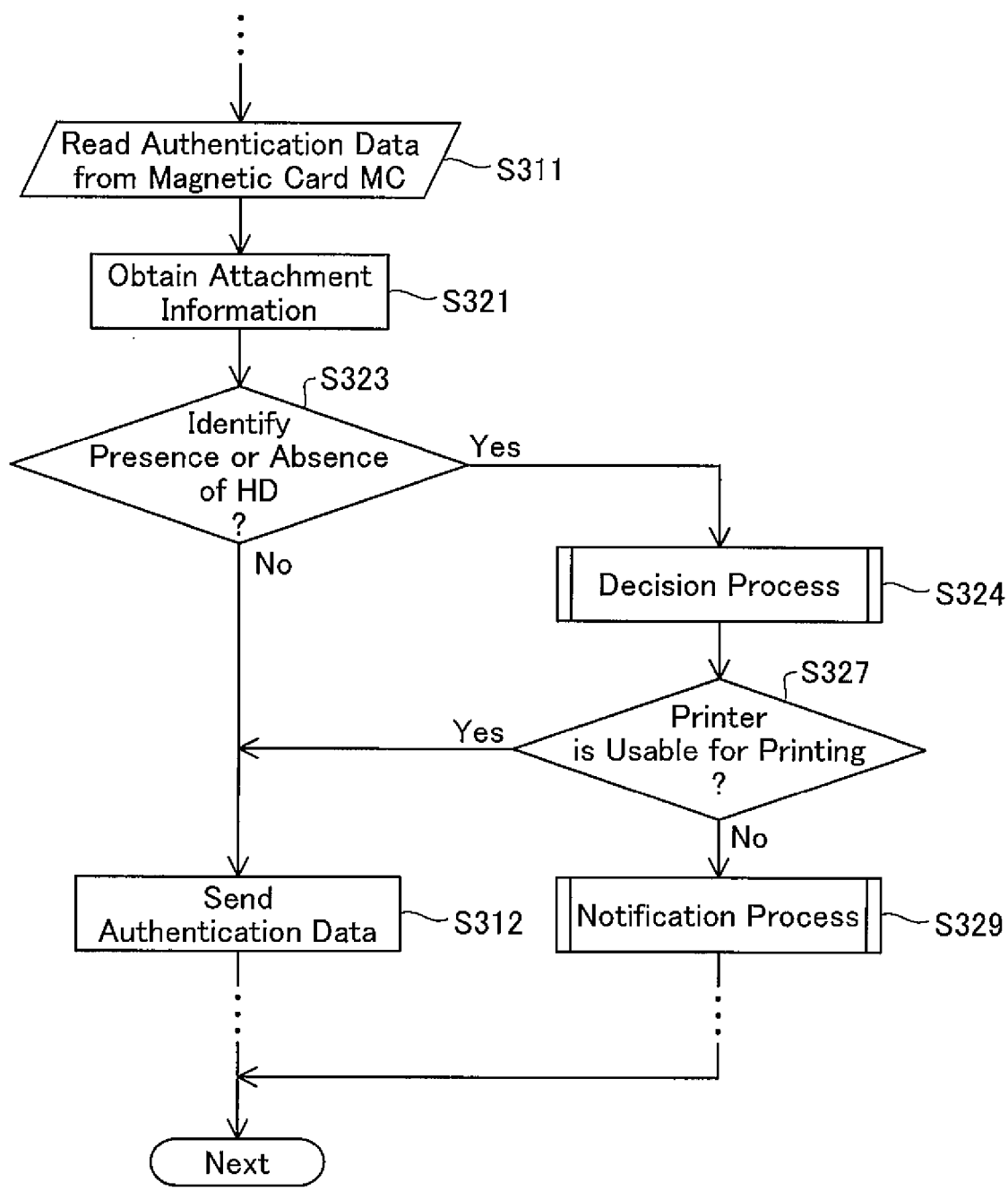
FIG. 17 is a flowchart showing a modified flow of the authentication printing process in a modified example of the first embodiment.

One modified example of the first embodiment is described below. FIG. 17 is a flowchart showing a modified flow of the authentication printing process in a modified example of the first embodiment. The like processing steps to those in the authentication printing process of the first embodiment shown in FIG. 11 are expressed by the like step numbers (steps S311 and S312) and are not specifically explained here. In this modified flow, the printer PRT1 obtains attachment information of the printer (step S321) after reading out the authentication data from the magnetic card MC (step S311). The printer PRT1 analyzes the attachment information obtained from the MIB and identifies the presence or the absence of a hard disk (HD) (step S323). Upon identification of the absence of the HD (step S323: no), the printer PRT1 performs the general processing flow of and after step S312.

Upon identification of the presence of the HD (step S323: ye), on the other hand, the printer PRT1 performs a decision process (step S324). The decision process determines whether the printer is usable for printing. When the HD attached to the printer PRT1 is readily detachable and has the low security strength (for example, an external hard disk by USB connection), the printer PRT1 is determined to be unusable for printing (step S327). In response to the decision 'unusable for printing' (step S327: no), the printer PRT1 performs a notification process (step S329). When the HD attached to the printer PRT1 is designed not to store the print data and has the high security strength, the printer PRT1 is determined to be usable for printing (step S327: yes). The printer PRT1 then performs the general processing flow of and after step S312.

The notification process of step S329 may display an alarm message showing the printer PRT1 is unusable for printing on the liquid crystal display panel DSP1 and may sound a buzzer for alarming. The legal user who requires printing the classified print data does not generally use the printer of the low security strength, such as the printer equipped with an external hard disk, for printing. When someone mistakenly or intentionally tries to print the classified print data with the printer of the low security strength, it is thus preferable to sound a buzzer for alarming, in addition to the display of the alarm message.

In this modified example of the first embodiment, the printer PRT1 itself determines its usability for printing. This arrangement desirably simplifies the system configuration. Upon determination that the printer PRT1 is unusable for printing, the notification process is performed to display an alarm message on the liquid crystal display panel DSP1 of the printer PRT1. The user is thus immediately informed of the reason of failed printing. Sounding the buzzer desirably informs people around the printer PRT1 of a wrong or malicious try of printing under the condition of potential information leakage. This arrangement thus effectively reduces the possibility of illegal printing.

F. Second Embodiment

Figure 18:
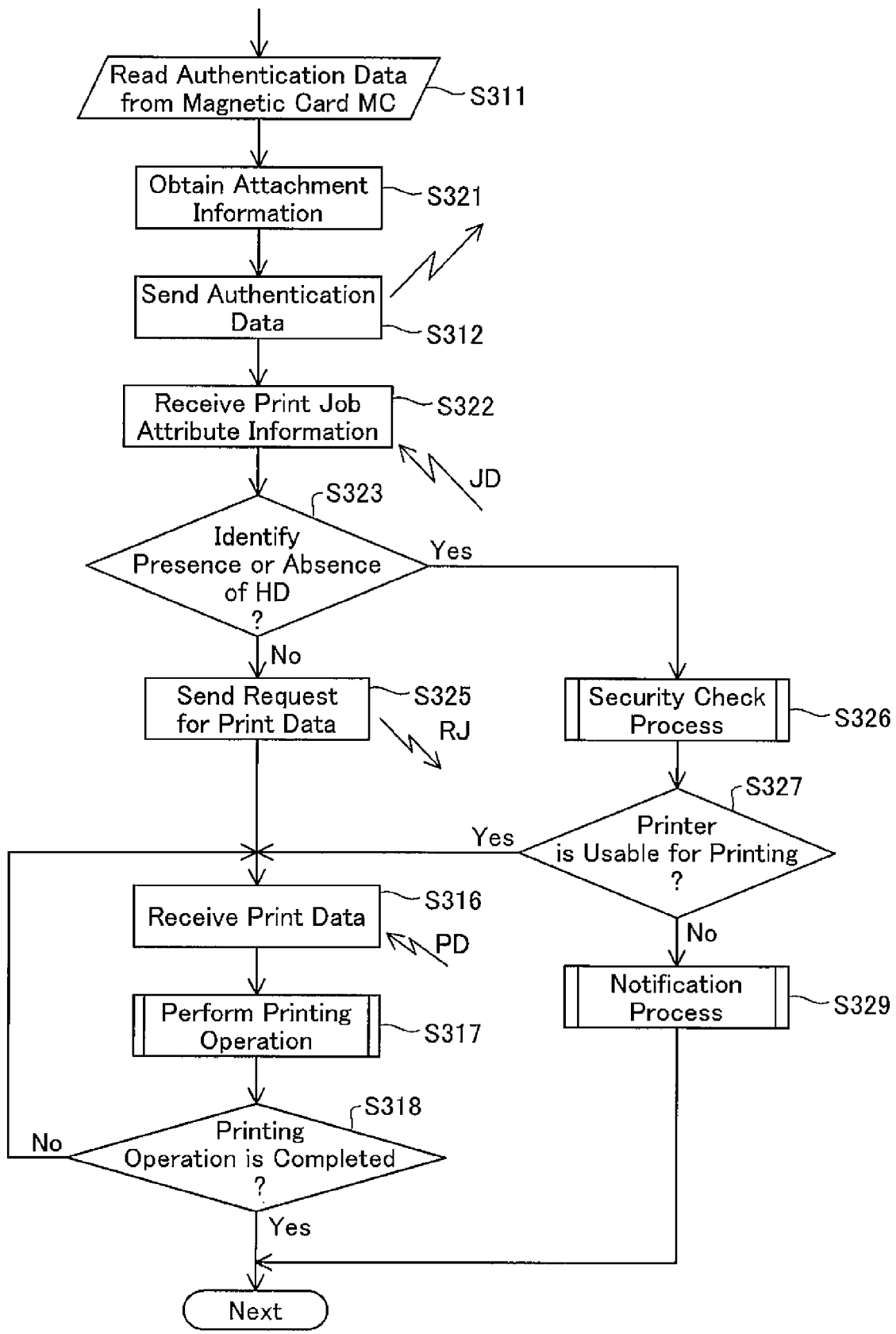
FIG. 18 is a flowchart showing part of an authentication printing process executed by a printer in a second embodiment of the invention.

The modified example of the first embodiment determines whether the printer PRT1 is usable or unusable for printing, based on the attachment information of the printer PRT1, prior to the transmission of the authentication data. Namely the procedure of the modified example determines the permission or prohibition of printing with the user's selected printer, prior to communication with the authentication server SVa1 and the printer server SVp1. As described below with reference to the flowcharts of FIGS. 18 and 19, the authentication printing process of a second embodiment determines the permission or prohibition of printing with the printer PRT1, after transmission of authentication data from the printer PRT1 to the authentication server SVa1 and transmission of a print instruction from the authentication server SVa1 to the printer server SVp1. The like processing steps to those in the authentication printing process of the first embodiment shown in FIG. 11 and those in the modified flow of the authentication printing process shown in FIG. 17 are expressed by the like step numbers and are not specifically explained here.

Figures 19, 20:
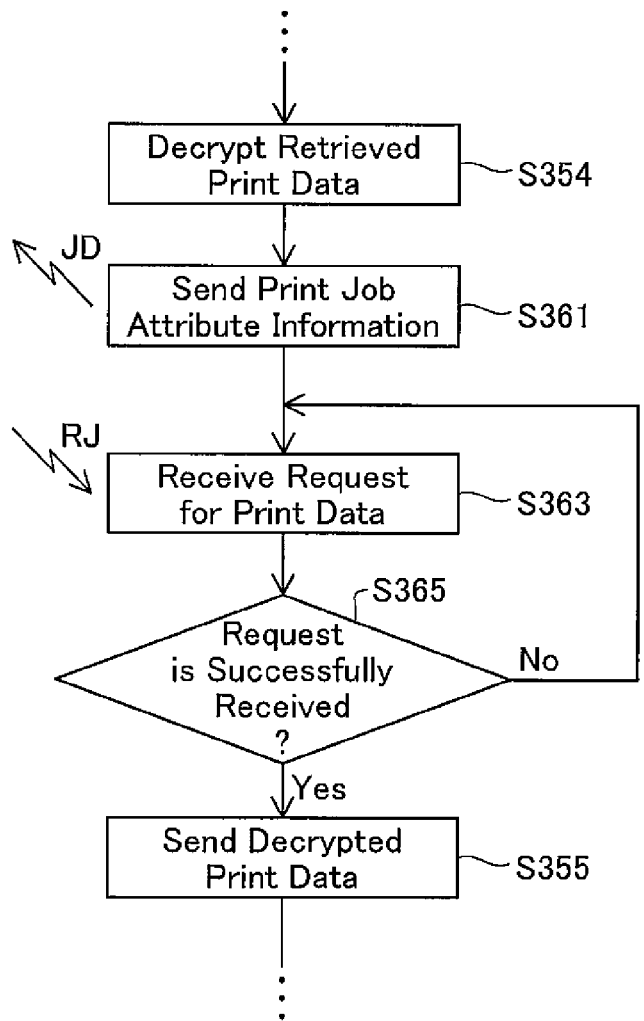
FIG. 19 is a flowchart showing part of the authentication printing process executed by a printer server in the second embodiment.
FIG. 20 shows one example of print job attribute information JD in the second embodiment.

In the authentication printing process of the second embodiment, the printer PRT1 reads out authentication data from the magnetic card MC (step S311), obtains-attachment information of the printer PRT1 (step S321), and transmits the authentication data to the authentication server SVa1 (step S312). The authentication server SVa1 authenticates the user based on the received authentication data (step S334 in FIG. 11). Upon successful authentication of the user, the authentication server SVa1 sends a print instruction to the printer server SVp1 (step S340 in FIG. 11). In response to reception of the print instruction, the printer server SVp1 decrypts the print data (step S354) and sends print job attribute information JD to the printer PRT1 selected for printing (step S361) as shown in the flowchart of FIG. 19. One example of the print job attribute information JD is shown in FIG. 20. The print job attribute information JD of the second embodiment includes the system permission ID, the print data, and the security level of the print data. The security level is classified into two stages, 'highly confidential' and 'low confidential' in the second embodiment.

The printer PRT1 receives the print job attribute information JD from the printer server SVp1 (step S322), and subsequently identifies the presence or the absence of the hard disk (HD), based on the previously obtained attachment information (step S323). Upon identification of the absence of the HD (step S323: no), the printer PRT1 determines permission of printing and outputs a request RJ for print data to the printer server SVp1 (step S325). The printer server SVp1 receives the request RJ for print data (step S363), verifies the successful reception of the request RJ for print data (step S365), and starts transmission of print data (step S355). When the printer PRT1 is not equipped with the HD, the processing of steps S316 to S318 is performed to implement printing as in the first embodiment.

Upon identification of the presence of the HD (step S323: yes), on the other hand, the printer PRT1 performs a security check process (step S326). The security check process refers to the obtained attachment information of the printer PRT1 and the print job attribute information JD received from the printer server SVp1 and specifies the permission or prohibition of printing the print data stored in the printer server SVp1 with the printer PRT1 from the viewpoint of the security check. The 'low confidential' documents (see FIG. 20) may be printable with the printer even equipped with the HD. When the printer PRT1 is determined to be usable for printing (step S327: yes), the printer PRT1 performs the processing of steps S316 to S318 to implement printing as in the modified example of the first embodiment. When the printer PRT1 is determined to be unusable for printing (step S327: no), the printer PRT1 performs the notification process (step S329) as in the modified example of the first embodiment and terminates the authentication printing process without an actual printing operation.

In the second embodiment discussed above, while there is data transmission between the printer PRT1 and the printer server SVp1, the printer PRT1 itself determines its usability for printing. This arrangement desirably simplifies the system configuration. Upon determination that the printer PRT1 is unusable for printing, the notification process is performed to display an alarm message on the liquid crystal display panel DSP1 of the printer PRT1. The user is thus immediately informed of the reason of failed printing. Sounding the buzzer desirably informs people around the printer PRT1 of a wrong or malicious try of printing under the condition of potential information leakage. This arrangement thus effectively reduces the possibility of illegal printing like the modified example of the first embodiment described previously.

G. Other Aspects

Figure 16:
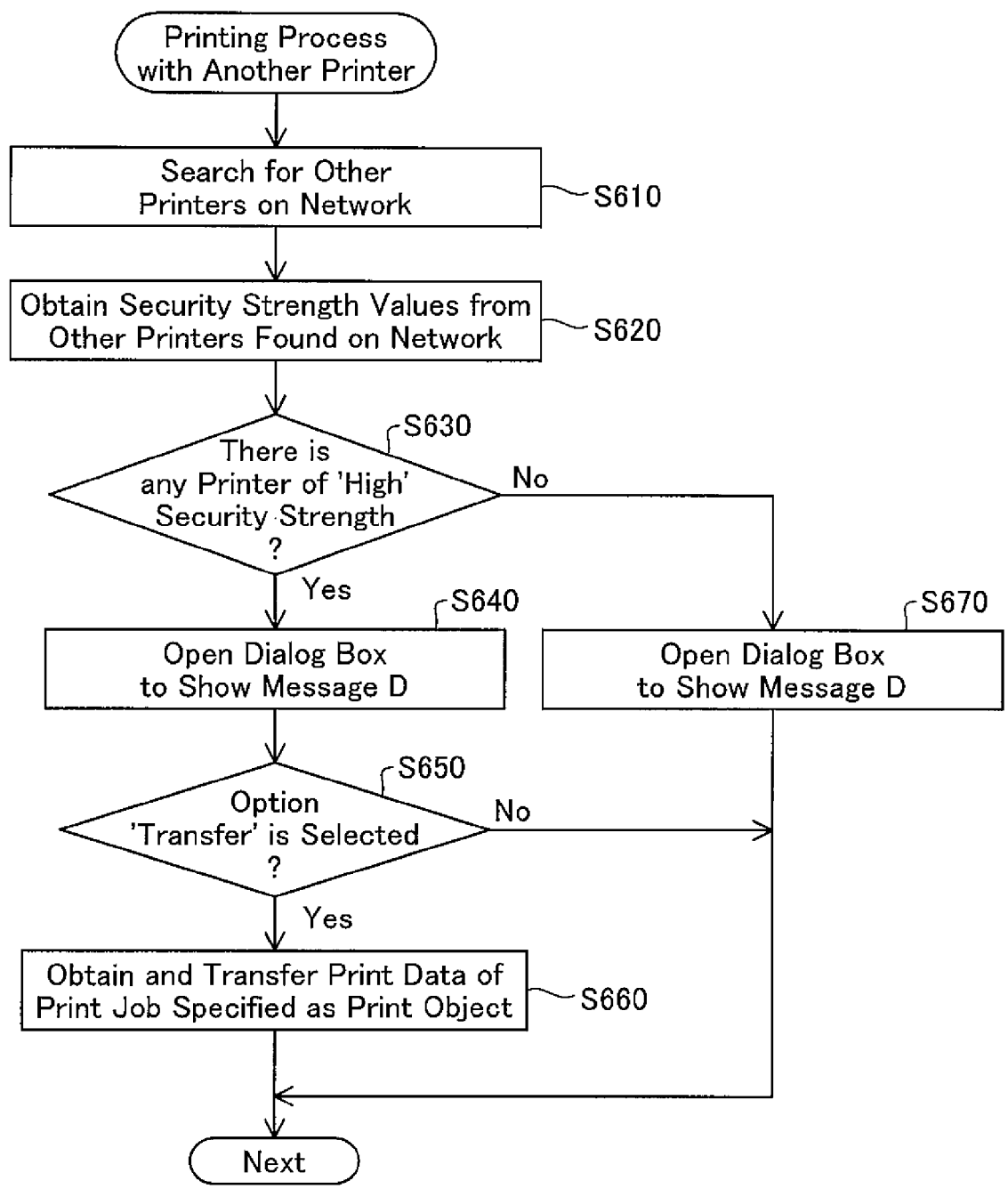
FIG. 16 is a flowchart showing the details of a printing process with another printer executed at step S600 in the authentication printing process of FIG. 12.

The printing process with another printer shown in the flowchart of FIG. 16 selects the printer of the 'high' security strength, that is, the printer with no restriction of the authentication printing process, as the another printer used for printing. The another printer selected for printing has the high security strength with no attachment of a hard disk and may be a printer of the identical model with that of the user's originally selected printer or a printer of the model having the equivalent or higher performance than that of the user's originally selected printer. When there are two or more printers with no restriction of the authentication printing process, a printer ready for immediate printing may be selected as the another printer. No selection of a printer occupied for another print job or for another application or a printer at a stop due to paper jam or out-of-toner enables the print job to be promptly printed.

The another printer may be selected among printers registered in advance as possible alternatives. The printer that has no restriction of the authentication printing process and is located near to the user's originally selected printer may be used as the another printer.

The embodiments and their modified examples discussed above are to be considered in all aspects as illustrative and not restrictive. There may be many modifications, changes, and alterations without departing from the scope or spirit of the main characteristics of the present invention. For example, the authentication printing process specifies the security strength of the printer based on the attachment information representing the presence or the absence of the hard disk (HD). The attachment information may represent the presence or the absence of a USB memory or another external storage device, or may represent the presence or the absence of an authentication device, such as a magnetic card reader or a fingerprint authentication device.

In the authentication printing system of the embodiment, the printer identifies the presence or the absence of the hard disk (HD) and the security level of the document (print data) in the authentication printing process. Such identification may be performed alternatively by the authentication server or by the printer server. The authentication server or the printer server may obtain the attachment information in advance via the network, prior to the identification. In the authentication printing system of the embodiment, the restriction of authentication printing is basically the option 'no print'. Another restriction of authentication printing may allow printing a document with a watermark 'Internal Use Only' on the printing face. The density of the watermark may be increased according to the security level of the document. Still another restriction of authentication printing may use a printer equipped with a speech synthesis system and allow printing a document with a voice message of 'Document A is now printing'. Another restriction of authentication printing may allow printing a document with notification of the administrator of the authentication printing system of the fact that the document is being printed with a specific printer of the low security strength by an e-mail or by a voice message. The e-mail recommends that the system administrator should go to the specific printer and check the printout.

What is claimed is:

1. An authentication printing apparatus configured to perform an authentication printing process, which externally receives print data and prints the received print data on completion of a preset authentication operation, the authentication printing apparatus comprising:
    an authentication data input module configured to input authentication data for authentication operation;
    an attachment information acquisition module configured to obtain attachment information regarding attachment of a preset device to the authentication printing apparatus; and
    an authentication printing restriction module configured to, in response to reception of a print request for a printing operation with the authentication printing apparatus, control the authentication data input module to input the authentication data while controlling the attachment information acquisition module to obtain the attachment information and control the authentication printing process by referring to the input authentication data and the attachment information;
    wherein the authentication printing restriction module, when the input authentication data is invalid, prohibits a printing operation of the print data and when the input authentication data is valid, refers to the obtained attachment information and restricts the authentication printing process according to at least either of presence or absence of any device attached to the authentication printing apparatus and type of the attached device, wherein when the obtained attachment information indicates that a non-volatile storage device for storing the externally received print data itself is attached to the authentication printing apparatus, the authentication printing restriction module restricts a printing operation with the authentication printing apparatus.

2. The authentication printing apparatus in accordance with claim 1, wherein the authentication printing restriction module prohibits the authentication data input module from inputting the authentication data, as the restriction of the authentication printing process.

3. The authentication printing apparatus in accordance with claim 1, wherein the authentication printing restriction module prevents the authentication data from being output to an authentication processor that is configured to perform the authentication operation, as the restriction of the authentication printing process.

4. The authentication printing apparatus in accordance with claim 1, wherein the authentication printing restriction module restricts a print job of externally obtaining the print data and printing the obtained print data, as the restriction of the authentication printing process.

5. The authentication printing apparatus in accordance with claim 4, wherein the restriction of the print job limits acquisition of print job attribute information, which is to be referred to for externally obtaining the print data and printing the obtained print data.

6. The authentication printing apparatus in accordance with claim 1, the authentication printing apparatus further comprising:
a notification module configured to notify a user of information,
wherein when restricting the authentication printing process, the authentication printing restriction module controls the notification module to notify the user of information on the restriction.

7. The authentication printing apparatus in accordance with claim 4, the authentication printing apparatus further comprising:
a print job attribute information acquisition module configured to acquire print job attribute information, which is to be referred to for externally obtaining the print data and printing the obtained print data and includes information specifying a security level of the print data;
a security level identification module configured to, in response to reception of the print request for the printing operation with the authentication printing apparatus, identifies the security level of the print data specified by the obtained print job attribute information; and
a printing module configured to, when the authentication printing restriction module restricts the authentication printing process, obtain the print data and print the obtained print data with regard to the print job having the security level specified by the print job attribute information and identified by the security level identification module to be not higher than a preset reference level.

8. The authentication printing apparatus in accordance with claim 7, the authentication printing apparatus further comprising:
a verification module configured to, when the authentication printing restriction module restricts the authentication printing process, ask a user to verify whether the printing operation is to be continued with regard to the print job having the security level specified by the print job attribute information and identified by the security level identification module to be higher than the preset reference level,
where the printing module obtains the print data and prints the obtained print data, on verification that printing operation is to be continued.

9. The authentication printing apparatus in accordance with claim 1, wherein the attachment information includes a security strength representing a difficulty in externally reading out the print data stored in the storage device, and
the authentication printing restriction module restricts a print job of externally obtaining the print data and printing the obtained print data, when the security strength is not higher than a predetermined reference value.

10. The authentication printing apparatus in accordance with claim 4, wherein the authentication printing restriction module refers to the obtained attachment information and causes the print job to be executed by another printing apparatus other than the authentication printing apparatus, as the restriction of the print job.

11. An authentication printing system configured to perform a printing operation on completion of authentication in response to a print request, the authentication printing system comprising:
multiple printing apparatuses, each equipped with an authentication data input module configured to input authentication data for authentication operation and arranged to externally receive a print job and perform a printing operation of print data specified by the print job;
a print data storage device configured to store the print data specified by the print job; and
an authentication device configured to, in response to the print request for the print job to the printing apparatus, authenticate the print request and cause one of the multiple printing apparatuses to perform an authentication printing process of executing the print job and printing the specified print data,
wherein the multiple printing apparatuses, the print data storage device, and the authentication device are mutually connected via a network,
the authentication printing system further comprising:
an attachment information acquisition module configured to obtain attachment information regarding attachment of a preset device to the printing apparatus; and
an authentication printing restriction module configured to, in response to reception of a print request for a printing operation with the printing apparatus, control the authentication data input module to input the authentication data while controlling the attachment information acquisition module to obtain the attachment information and control the authentication printing process by referring to the input authentication data and the attachment information;
wherein the authentication printing restriction module, when the in authentication data is invalid, prohibits a printing operation of the print data, and when the input authentication data is valid, refers to the obtained attachment information and restricts the authentication printing process according to at least either of presence or absence of any device attached to the printing apparatus and type of the attached device, wherein
when the obtained attachment information indicates that a non-volatile storage device for storing the externally received print data itself is attached to the printing apparatus, the authentication printing restriction module restricts a printing operation with the printing apparatus.

12. The authentication printing system in accordance with claim 11, wherein when execution of a print job in response to the print request is restricted in a certain printing apparatus as the restriction of the authentication printing process based on the obtained attachment information, the authentication printing restriction module causes the print job to be executed by another printing apparatus, which is other than the certain printing apparatus and is determined to have no restriction of the authentication printing process, based on attachment information regarding the another printing apparatus.

13. The authentication printing system in accordance with claim 12, wherein the another printing apparatus is any one of:
  (a) a printing apparatus determined to have no restriction of the authentication printing process and designed to be an identical model with that of the certain printing apparatus or to be a model of equivalent or higher performance than that of the certain printing apparatus;
  (b) a printing apparatus determined to have no restriction of the authentication printing process and set ready for an immediate printing operation;
  (c) a printing apparatus determined to have no restriction of the authentication printing process and registered in advance as an alternative in the case where the certain printing apparatus is unusable for printing; and
  (d) a printing apparatus determined to have no restriction of the authentication printing process and located near to the certain printing apparatus.

14. An authentication printing control method of performing an authentication printing process, which externally receives print data and prints the received print data with a printing apparatus on completion of a preset authentication operation, the authentication printing control method comprising:
  inputting authentication data for authentication operation;
  obtaining attachment information regarding attachment of a preset device to the printing apparatus; and
  in response to reception of a print request for a printing operation with the printing apparatus, controlling the authentication printing process by referring to the input authentication data and the attachment information,
  wherein when the input authentication data is invalid, prohibiting a printing operation of the print data, and when the input authentication data is valid, referring to the obtained attachment information and restricting the authentication printing process according to at least either of presence or absence of any device attached to the printing apparatus and type of the attached device; and
  when the obtained attachment information indicates that a non-volatile storage device for storing the externally received print data itself is attached to the printing apparatus, restricting a printing operation with the printing apparatus.

* * * * *